US012775381B2

(12) United States Patent
Liu et al.

(10) Patent No.: US 12,775,381 B2
(45) Date of Patent: Oct. 27, 2026

(54) APPARATUS AND METHOD WITH CHECKPOINT DATA PROCESSING

(71) Applicant: Samsung Electronics Co., Ltd., Suwon-si (KR)

(72) Inventors: Tian Liu, Xi'an (CN); Junyeon Lee, Suwon-si (KR); Xing Biao, Xi'an (CN); Byungwoo Bang, Suwon-si (KR); Huiru Deng, Xi'an (CN); Fengtao Xie, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/018,818

(22) Filed: Jan. 13, 2025

(65) Prior Publication Data

US 2025/0244875 A1 Jul. 31, 2025

(30) Foreign Application Priority Data

Jan. 25, 2024 (CN) ......................... 202410110199.7
Oct. 15, 2024 (KR) ........................ 10-2024-0140259

(51) Int. Cl.
*G06F 3/06* (2006.01)

(52) U.S. Cl.
CPC .......... *G06F 3/0611* (2013.01); *G06F 3/0608* (2013.01); *G06F 3/064* (2013.01); *G06F 3/0679* (2013.01)

(58) Field of Classification Search
CPC ...... G06F 3/0611; G06F 3/0608; G06F 3/064; G06F 3/0679
See application file for complete search history.

(56) References Cited

U.S. PATENT DOCUMENTS

| | | | |
|---|---|---|---|
| 8,135,677 B2 | 3/2012 | Matsuzawa et al. | |
| 2019/0324856 A1* | 10/2019 | Zhao | G06N 3/098 |
| 2022/0229806 A1 | 7/2022 | Copley et al. | |

FOREIGN PATENT DOCUMENTS

| | | | |
|---|---|---|---|
| JP | 6123388 | B | 9/2014 |
| KR | 10-2022482 | B | 6/2019 |
| WO | WO 2017/216858 | A | 12/2017 |

* cited by examiner

*Primary Examiner* — Jae U Yu
(74) *Attorney, Agent, or Firm* — NSIP Law

(57) ABSTRACT

An electronic device with data processing includes one or more processors configured to in response to receiving a checkpoint signal, determine a location of related data of an application in a memory region, based on the location of the related data in the memory region, perform a checkpointing operation on the related data using either one or both of a host processor and an accelerator processor, and compress the related data using the either one or both of the host processor and the accelerator processor that has performed the checkpointing operation, wherein the location of the related data in the memory region comprises a location in either one or both of a host memory region and an accelerator memory region.

19 Claims, 16 Drawing Sheets

```
55e49cb45000-55e49cc49000 r-xp 00000000 08:12 46661691     /bin/bash
55e49ce55000-55e49ce5f000 rw-p 00000000 00:00 0
55e49e782000-55e49e94a000 rw-p 00000000 00:00 0            [heap]
7fc5d246f000-7fc5d247a000 r-xp 00000000 08:12 45613278     /lib/x86_64-linux-gnu/libnss_files-2.27.so
....
7fc5d267b000-7fc5d2681000 rw-p 00000000 00:00 0
7fc5d2681000-7fc5d2698000 r-xp 00000000 08:12 45613275     /lib/x86_64-linux-gnu/libnsl-2.27.so
7fc5d2aaf000-7fc5d2caf000 ---p 00008000 08:12 45613276     /lib/x86_64-linux-gnu/libnss_compat-2.27.so
....
7fc5d36fa000-7fc5d36fb000 rw-p 0002a000 08:12 45613214     /lib/x86_64-linux-gnu/ld-2.27.so
7fc5d36fb000-7fc5d36fc000 rw-p 00000000 00:00 0
7fff1dbfc000-7fff1dc1d000 rw-p 00000000 00:00 0            [stack]
7fff1dc3b000-7fff1dc3e000 r--p 00000000 00:00 0            [vvar]
7fff1dc3e000-7fff1dc40000 r-xp 00000000 00:00 0            [vdso]
ffffffffff600000-ffffffffff601000 r-xp 00000000 00:00 0    [vsyscall]
```

FIG. 2

APPARATUS AND METHOD WITH CHECKPOINT DATA PROCESSING

CROSS-REFERENCE TO RELATED APPLICATIONS

This application claims the benefit under 35 USC § 119(a) of Chinese Patent Application No. 202410110199.7 filed on Jan. 25, 2024, in the China National Intellectual Property Administration, and Korean Patent Application No. 10-2024-0140259 filed on Oct. 15, 2024, in the Korean Intellectual Property Office, the entire disclosures of which are incorporated herein by reference for all purposes.

BACKGROUND

1. Field

The following description relates to an apparatus and method with checkpoint data processing.

2. Description of Related Art

Checkpointing may refer to a technique that provides fault tolerance to computing systems. Checkpointing may be a mechanism used in a computing system to protect an execution state of an application (e.g., a program and/or a process). Checkpointing may store an intermediate state of an application in a non-volatile memory to restore, in the event of a failure in a system, the system to a state where the system was in before the failure occurred. As data processing (e.g., compression) is performed on related data of the application at a checkpoint, overhead may be incurred thereby.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, an electronic device with data processing includes one or more processors configured to in response to receiving a checkpoint signal, determine a location of related data of an application in a memory region, based on the location of the related data in the memory region, perform a checkpointing operation on the related data using either one or both of a host processor and an accelerator processor, and compress the related data using the either one or both of the host processor and the accelerator processor that has performed the checkpointing operation, wherein the location of the related data in the memory region comprises a location in either one or both of a host memory region and an accelerator memory region.

For the performing of the checkpointing operation, the one or more processors may be configured to, in response to first partial data of the related data being in the host memory region, determine a first overhead for performing the checkpointing operation on the first partial data using the host processor, determine a second overhead for performing the checkpointing operation on the first partial data using the accelerator processor, perform the checkpointing operation on the first partial data using a processor corresponding to a smaller one between the first overhead and the second overhead, and in response to second partial data of the related data being in the accelerator memory region, perform the checkpointing operation on the second partial data using the accelerator processor.

The first overhead may include a time for the host processor to compress the first partial data and a time for the host processor to store the compressed first partial data in the memory, and the second overhead may include a time for moving the first partial data from the host memory region to the accelerator memory region, a time for compressing the moved first partial data, a time for moving the compressed first partial data from the accelerator processor to the host processor, and a time for storing the compressed first partial data in the memory.

For the compressing, the one or more processors may be configured to in response to performing the checkpointing operation using the accelerator processor on data located in the accelerator memory region of the related data, determine a size and a distribution characteristic of the data located in the accelerator memory region, and compress the data located in the accelerator memory region based on the determined size and the determined distribution characteristic.

For the compressing, the one or more processors may be configured to in response to the determined size of the data located in the accelerator memory region being greater than a first threshold value, and in response to the determined distribution characteristic indicating that the data located in the accelerator memory region is stored successively, partition the data located in the accelerator memory region into a plurality of data blocks based on a second threshold value greater than the first threshold value, and compress each of the plurality of data blocks using the accelerator processor.

The data located in the accelerator memory region may include a plurality of data blocks, for the compressing, the one or more processors may be configured to in response to the distribution characteristic indicating that storage locations of the plurality of data blocks are proximate to each other, merge the plurality of data blocks, and compress the plurality of data blocks using the accelerator processor, and the plurality of data blocks may have a size less than a third threshold value.

The data located in the accelerator memory region may include a plurality of data blocks, and for the compressing, the one or more processors may be configured to, in response to the distribution characteristic indicating that the plurality of data blocks is sparsely distributed, partition the plurality of data blocks into a plurality of groups, assign a plurality of streams to each of the plurality of groups, and compress the data located in the accelerator memory region based on the accelerator processor and the plurality of streams.

For the performing of the checkpointing operation, the one or more processors may be configured to perform the checkpointing operation in parallel, and respective files generated by the checkpointing operation performed in parallel may be independent of each other.

In one or more general aspects, a processor-implemented method with data processing includes receiving a checkpoint signal, in response to receiving the checkpoint signal, determining a location of related data of an application in a memory region, based on the location of the related data in the memory region, performing a checkpointing operation on the related data using either one or both of a host processor and an accelerator processor, and compressing the related data using the either one or both of the host processor and the accelerator processor that has performed the checkpointing operation, wherein the location of the related data in the memory region may include a location in either one or both of a host memory region and an accelerator memory region.

The performing of the checkpointing operation may include, in response to first partial data of the related data being in the host memory region, determining a first overhead for performing the checkpointing operation on the first partial data using the host processor, determining a second overhead for performing the checkpointing operation on the first partial data using the accelerator processor, performing the checkpointing operation on the first partial data using a processor corresponding to a smaller one between the first overhead and the second overhead, and in response to second partial data of the related data being in the accelerator memory region, performing the checkpointing operation on the second partial data using the accelerator processor.

The first overhead may include a time for the host processor to compress the first partial data and a time for the host processor to store the compressed first partial data in a memory, and the second overhead may include a time for moving the first partial data from the host memory region to the accelerator memory region, a time for compressing the moved first partial data, a time for moving the compressed first partial data from the accelerator processor to the host processor, and a time for storing the compressed first partial data in the memory.

The compressing may include, in response to performing the checkpointing operation using the accelerator processor on data located in the accelerator memory region of the related data, determining a size and a distribution characteristic of the data located in the accelerator memory region, and compressing the data located in the accelerator memory region based on the determined size and the determined distribution characteristic.

The compressing may include, in response to the determined size of the data located in the accelerator memory region being greater than a first threshold value, and in response to the determined distribution characteristic indicating that the data located in the accelerator memory region is stored successively, partitioning the data located in the accelerator memory region into a plurality of data blocks based on a second threshold value greater than the first threshold value, and compressing each of the plurality of data blocks using the accelerator processor.

The compressing may include, in response to the data comprising a plurality of data blocks, and in response to the distribution characteristic indicating that storage locations of the plurality of data blocks are proximate to each other, merging the plurality of data blocks, and compressing the plurality of data blocks using the accelerator processor, and the plurality of data blocks has a size less than a third threshold value.

The data located in the accelerator memory region may include a plurality of data blocks, and the compressing may include, in response to the distribution characteristic indicating that the plurality of data blocks is sparsely distributed, partitioning the plurality of data blocks into a plurality of groups, assigning a plurality of streams to each of the plurality of groups, and compressing the data located in the accelerator memory region based on the accelerator processor and the plurality of streams.

The performing of the checkpointing operation may include performing the checkpointing operation in parallel, and respective files generated by the checkpointing operation performed in parallel may be independent of each other.

In one or more general aspects, a non-transitory computer-readable storage medium may store instructions that, when executed by one or more processors, configure the one or more processors to perform any one, any combination, or all of operations and/or methods disclosed herein.

In one or more general aspects, an electronic device with data processing includes one or more processors configured to, based on a location of related data of an application in a memory region, determining whether to perform a checkpointing operation on the related data using either one of a host processor and an accelerator processor, and in response to determining to perform the checkpointing operation using the accelerator processor on data located in an accelerator memory region of the related data, determine a size and a distribution characteristic of the data located in the accelerator memory region, and compress the data located in the accelerator memory region based on the determined size and the determined distribution characteristic.

For the compressing, the one or more processors may be configured to, based on the determined size and the determined distribution characteristic, perform any one of partitioning the data located in the accelerator memory region into a plurality of data blocks, merging the plurality of data blocks, and assigning a plurality of streams to each of a plurality of groups into which the plurality of data blocks are partitioned, and compress the data located in the accelerator memory region based on a result of the any one of the partitioning of the data, the merging of the plurality of data blocks, and the assigning of the plurality of streams.

Other features and aspects will be apparent from the following detailed description, the drawings, and the claims.

BRIEF DESCRIPTION OF THE DRAWINGS

FIG. 2 illustrates an example of address information of an application on a host processor according to one or more embodiments.

Figure 1:
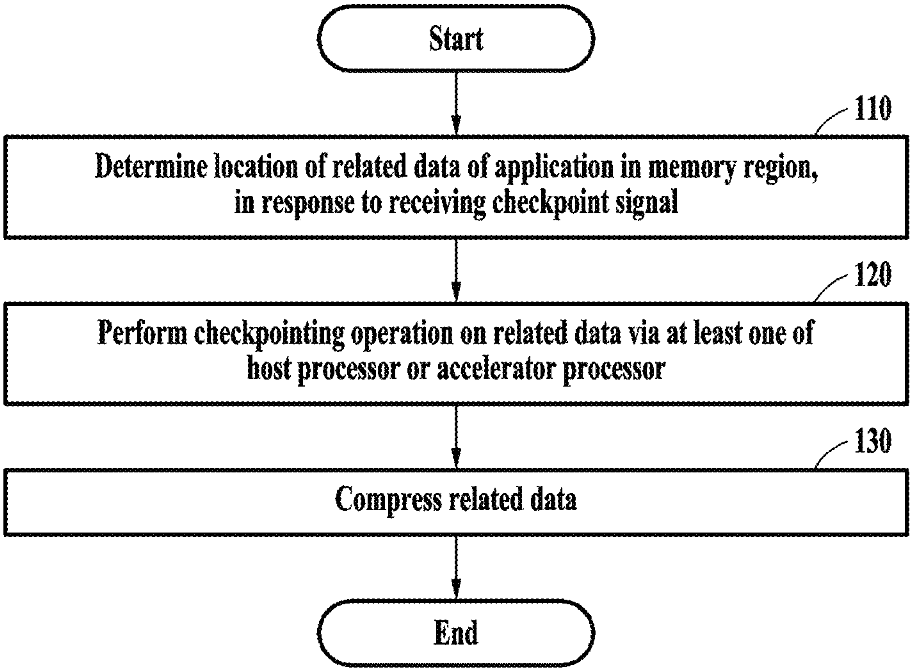
FIG. 1 illustrates an example operational flow of a data processing method with a checkpointing operation according to one or more embodiments.

Throughout the drawings and the detailed description, unless otherwise described or provided, the same drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third," or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but is used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on," "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" to specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment," and "one or more examples" has a same meaning as "in one or more embodiments").

Hereinafter, example embodiments will be described in detail with reference to the accompanying drawings. When describing the examples with reference to the accompanying drawings, like reference numerals refer to like components and a repeated description related thereto is omitted.

FIG. 1 illustrates an example operational flow of a data processing method with a checkpointing operation according to one or more embodiments.

Figure 19:
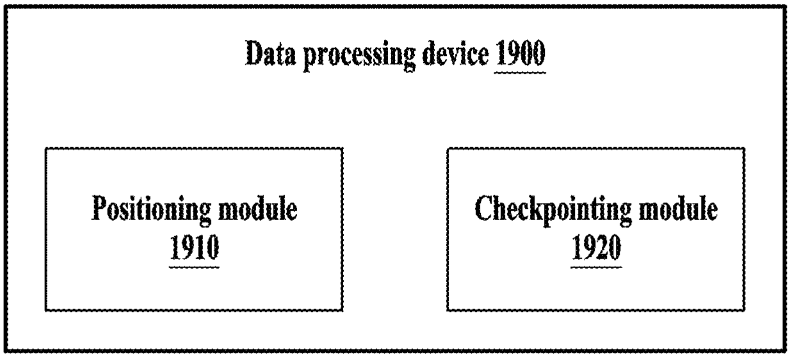
FIG. 19 illustrates an example of a data processing device according to one or more embodiments.
Figure 20:
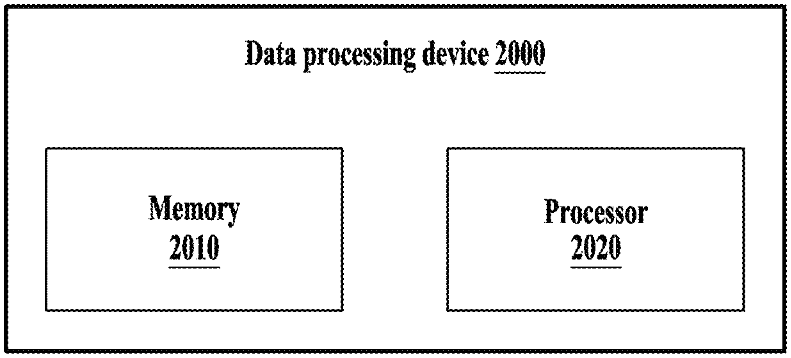
FIG. 20 illustrates an example of a data processing device according to one or more embodiments.
Figure 21:
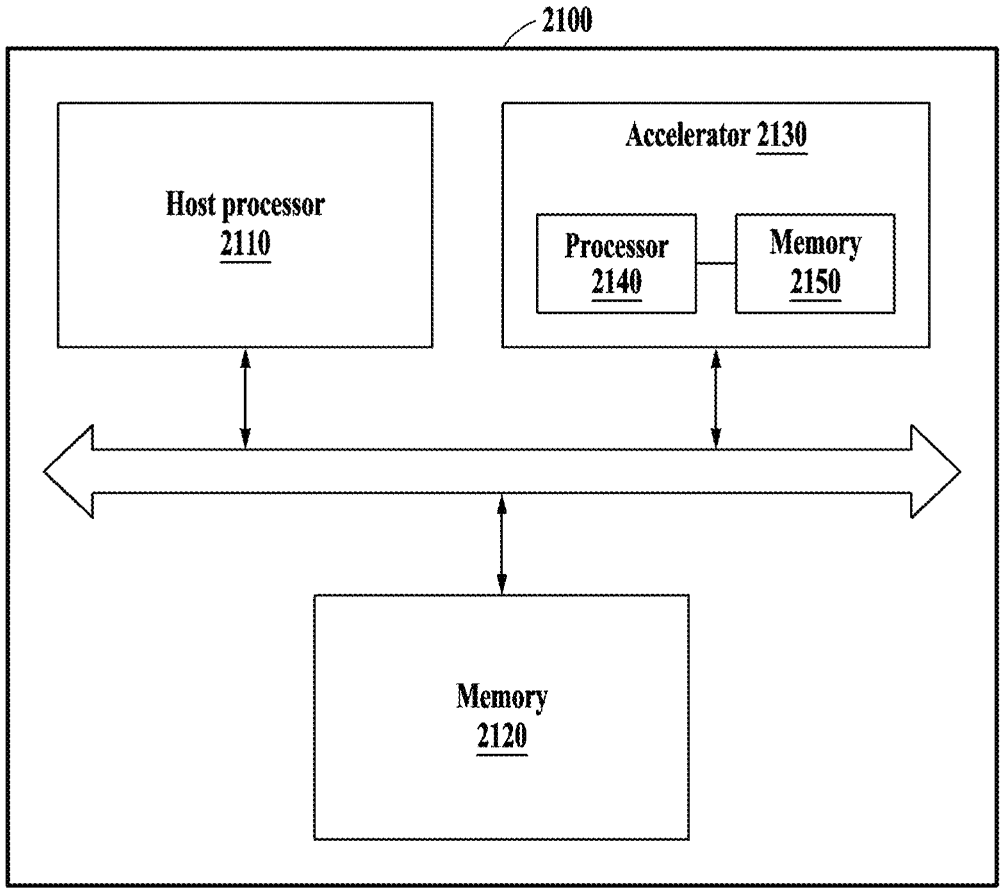
FIG. 21 illustrates an example of a data processing device according to one or more embodiments.

According to one or more embodiments, operations of a data processing method with a checkpointing operation may be performed by a data processing device (e.g., a data processing device 1900 of FIG. 19, a data processing device 2000 of FIG. 20, and/or a data processing device 2100 of FIG. 21). Herein, a "data processing device" may mean an electronic device with data processing. Operations 110 to 130 to be described hereinafter may be performed sequentially in the order and manner as shown and described below with reference to FIG. 1, but the order of one or more of the operations may be changed, one or more of the operations may be omitted, and two or more of the operations may be performed in parallel or simultaneously without departing from the spirit and scope of the example embodiments described herein.

A checkpoint may refer to a point at which a state of a system or program (e.g., an application) at a specific point in time is stored to provide fault tolerance to a computing system. A checkpointing operation may refer to a series of data processing processes that stores, at a specific point, a state of a system or program at a specific point in time (e.g., the checkpoint), thereby providing fault tolerance to the system. A checkpoint signal (or checkpointing signal) described herein may refer to a signal indicating a specific point (e.g., the checkpoint) of a system or program at which a state of the system or program at a specific point in time is stored. For example, the checkpoint signal may indicate the checkpoint of the checkpointing operation.

At operation 110, the data processing device may determine, in response to receiving a checkpoint signal, a location of related data of an application in a memory region. When receiving the checkpoint signal, the data processing device may determine the location of the related data of the application in the memory region.

The related data of the application may refer to data that is to be stored on the application to perform a checkpointing operation. The related data may be data indicative of a current state of the application. In the event of or in response to a crash in the application, the related data may be used to restore the application to an execution state in which the application was before the crash. A host memory region may refer to a memory region included in a host, and an accelerator memory region may refer to a memory region included in an accelerator.

The checkpoint signal may be transmitted from an operating system or system on which the application operates. For example, in the event of or in response to a crash in the application, the checkpoint signal may be transmitted from the operating system or system to restore the application to an execution state that precedes the crash.

The location in the memory region at which the related data used for the checkpointing operation is stored may be determined in various ways. For example, the location in the memory region that stores the related data used for the checkpointing operation may be determined through directory scanning. The location in the memory region of the related data used for the checkpointing operation may be acquired through a process map (e.g., /proc/xx/maps).

In an embodiment, the location in the memory region of the related data used for the checkpointing operation may be determined through scanning by a wrapper layer (e.g., a wrapper layer 320 of FIG. 3) specified by an accelerator processor.

The memory region in which the related data used for the checkpointing operation is stored may be an entirety or portion of a memory region used by the application (e.g., process). For example, the memory region in which the related data used for the checkpointing operation is stored may be a memory region selected from the memory region used by the application based on memory region characteristics.

The memory region in which the related data used for the checkpointing operation is stored may not include a memory region corresponding to a vector (e.g., a "vsyscall" vector and a "vvar" vector) in the memory region used by the application.

The memory region in which the related data used for the checkpointing operation is stored may not include a read-only memory region in the memory region used by the application. An example of a method of determining a location in a memory region in which related data used for a checkpointing operation is stored will be described in more detail below with reference to FIGS. 2 and 3.

In an embodiment, when the checkpointing operation is performed, execution of the process may be frozen. In this case, freezing the execution of the process may include, but is not limited to, stopping the execution of the process and cloning the process. The process may be stopped until the checkpointing operation is completed. Subsequently, cloning the process may generate a copy of the process, and the checkpointing operation may be performed on the copy. The original process may be released from the stoppage and continue to be executed.

At operation 120, the data processing device may perform a checkpointing operation on the related data via at least one of a host processor and/or an accelerator processor. The data processing device may perform the checkpointing operation on the related data via the at least one of the host processor and/or the accelerator processor, based on the location of the related data in the memory region. The location of the related data in the memory region may include a location in at least one of a host memory region and/or an accelerator memory region.

At operation 130, the data processing device may compress the related data. For example, the data processing device may compress the related data via the at least one of the host processor and/or the accelerator processor that has performed the checkpointing operation.

The host processor may refer to a processor included in the host and may include, but is not limited to, a central processing unit (CPU). The accelerator processor may refer to a processor included in the accelerator and may include, but is not limited to, a graphics processing unit (GPU), a neural processing unit (NPU), and/or a tensor processing unit (TPU). As described above, a processing unit that is to perform the checkpointing operation is not fixed (or "pinned" herein) and thus, as the data processing device of one or more embodiments determines the processing unit that is to perform the checkpointing operation based on the location of the related data of the application in the memory region, the data processing device of one or more embodiments may reduce overhead that may occur from the checkpointing operation.

FIG. 2 illustrates an example of address information of an application on a host processor according to one or more embodiments.

Referring to FIG. 2, address information of a process may be acquired through a /proc/pid/maps file. Of memory regions, "vvar," "vdso," and "vsyscall" may be excluded from the address information of the process due to their static nature. Of the memory regions, a region that is protected and unreadable may also be excluded from the address information of the process. As shown in FIG. 2, of the memory regions, address information of region(s) excluding the "vvar," "vdso," and "vsyscall" regions may be used as address information (or location) of a memory region to be used for a checkpointing operation. An example of the address information of the memory region will be described in more detail below with reference to FIG. 3.

Figure 3:
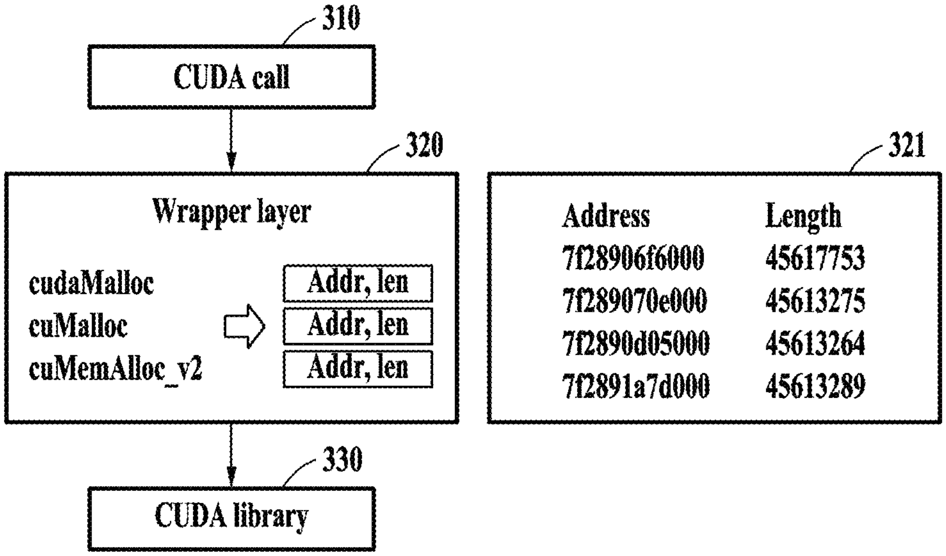
FIG. 3 illustrates an example of address information of an application on an accelerator processor according to one or more embodiments.

FIG. 3 illustrates an example of address information of an application on an accelerator processor according to one or more embodiments.

Referring to FIG. 3, a compute unified device architecture (CUDA) call 310 may be transmitted to a wrapper layer 320. The CUDA call 310 may refer to a call that invokes a function of a program that performs parallel computations on a GPU. A CUDA kernel function invoked via the CUDA call 310 may be used to process data in parallel on the GPU rather than a CPU. The wrapper layer 320 may transmit, to a CUDA library 330, memory information 321 to be used for a checkpointing operation. The memory information 321 transmitted to the CUDA library 330 may include address information and length information of a memory. The GPU may interpret all memory calls of a process and record memory information for each memory region to acquire information about a memory region in which related data to be used for the checkpointing operation is stored.

Figure 4:
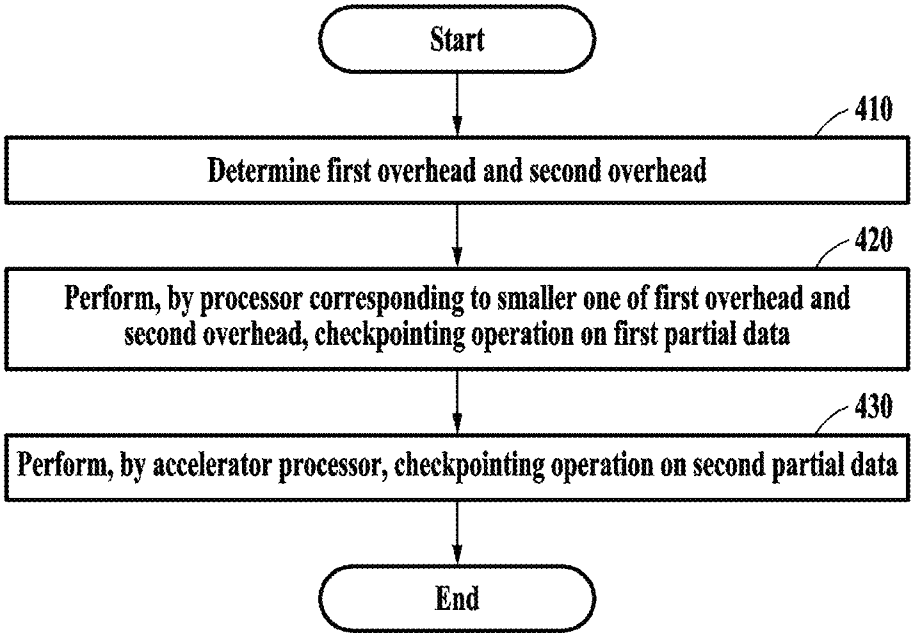
FIG. 4 illustrates an example operational flow of performing a checkpointing operation on related data according to one or more embodiments.

FIG. 4 illustrates an example operational flow of performing a checkpointing operation on related data according to one or more embodiments.

According to one or more embodiments, operations involved in a checkpointing operation to be performed on related data may be performed by a data processing device (e.g., the data processing device 1900 of FIG. 19, the data processing device 2000 of FIG. 20, and/or the data processing device 2100 of FIG. 21). Operations 410 to 430 to be described hereinafter may be performed sequentially in the order and manner as shown and described below with reference to FIG. 4, but the order of one or more of the operations may be changed, one or more of the operations may be omitted, and two or more of the operations may be performed in parallel or simultaneously without departing from the spirit and scope of the example embodiments described herein.

At operation 410, the data processing device may determine a first overhead and a second overhead. In response to first partial data of related data being in a host memory region, the data processing device may determine the first overhead for performing a checkpointing operation on the first partial data by a host processor. The data processing device may determine the second overhead for performing the checkpointing operation on the first partial data by an accelerator processor.

Here, overhead may represent overheads corresponding to data compression and data input/output (I/O). In an embodiment, the overhead may include, but is not limited to, power consumption, processing time, and/or the like. The first overhead may include, for example, a time for the host processor to compress the first partial data and a time for the host processor to store the compressed first partial data in a memory. The second overhead may include, for example, a time for moving the first partial data from the host memory region to an accelerator memory region, a time for compressing the moved first partial data, a time for moving the compressed first partial data from the accelerator processor to the host processor, and a time for storing the compressed first partial data in the memory.

At operation 420, the data processing device may perform the checkpointing operation on the first partial data using a processor corresponding to a smaller one between the first overhead and the second overhead. The processor corresponding to the smaller one of the first overhead and the second overhead may be one of the host processor and the accelerator processor corresponding to the smaller overhead and thus the data processing device of one or more embodiments may reduce the overhead incurred by the checkpointing operation.

At operation 430, the data processing device may perform the checkpointing operation on second partial data using the accelerator processor. In response to the second partial data of the related data being in the accelerator memory region, the data processing device may perform the checkpointing operation on the second partial data using the accelerator processor.

In response to the second partial data of the related data being in the accelerator memory region, the accelerator processor may directly perform the checkpointing operation on the second partial data. Operation 430 and operation 410 may be performed in any order.

Figure 5A:
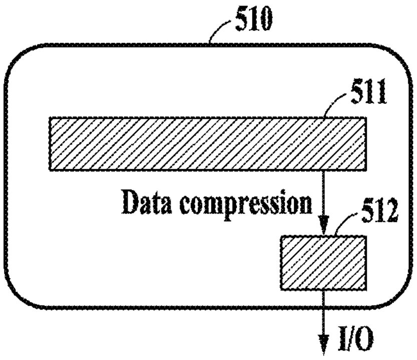
FIG. 5A illustrates an example of a first overhead according to one or more embodiments.
Figure 5B:
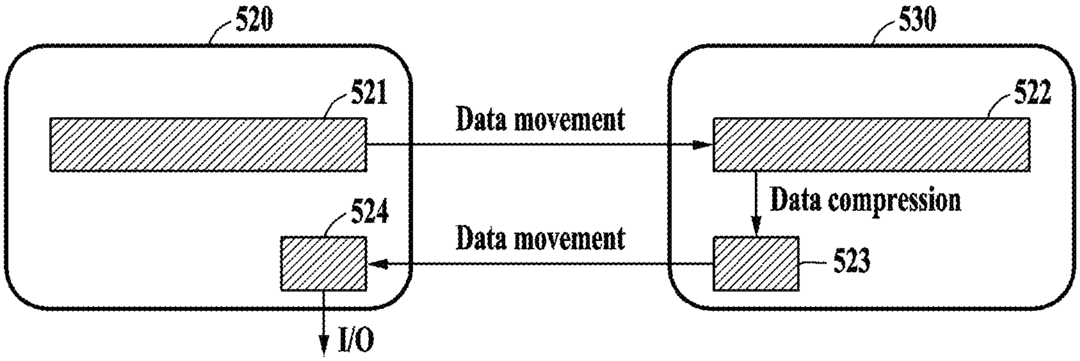
FIG. 5B illustrates an example of a second overhead according to one or more embodiments.

FIGS. 5A and 5B illustrate examples of overhead according to one or more embodiments.

FIG. 5A illustrates an example of a first overhead according to one or more embodiments.

The first overhead may include a time (c1) for a host processor to compress related data 511 (e.g., first partial data) in a host memory region 510 and a time (c2) for the host processor to store compressed related data 512 (e.g., compressed first partial data) in a memory. Referring to FIG. 5A, when the host processor (e.g., a CPU of a host) performs a checkpointing operation on the related data 511 (e.g., CPU data), the host processor may compress the related data 511 and output the compressed related data 512. In this process, the first overhead may include the time c1 for the host processor to compress the related data 511 and the time c2 (e.g., a time for the host processor to store the compressed first partial data in the memory) for the host processor to output the compressed related data 512 and store it in the memory. The time c1 and/or the time c2 may be modeled through simulations.

FIG. 5B illustrates an example of a second overhead according to one or more embodiments.

The second overhead may include a time (c1) for moving related data 521 (e.g., first partial data) from a host memory region 520 to an accelerator memory region 530, a time (c2) for compressing related data 522 moved to the accelerator memory region 530, a time (c3) for moving compressed related data 523 (e.g., compressed first partial data) from the accelerator memory region 530 to the host memory region 520, and a time (c4) for outputting compressed related data 524 (e.g., first partial data moved to the host memory region 520 after being compressed) moved to the host memory region 520 after being compressed and storing it in the memory.

For example, when an accelerator processor (e.g., a GPU, an NPU, a TPU, etc.) is used to perform a checkpointing operation on the related data 521 (e.g., CPU data), a CPU may move the related data 521 (e.g., CPU data) from the host memory region 520 to the accelerator memory region 530. The accelerator processor (e.g., a GPU) may compress the moved related data 522 (e.g., the moved CPU data) to generate the compressed related data 523. The compressed related data 523 (e.g., the compressed CPU data) may be moved to the host memory region 520, and the CPU may output the compressed and moved related data 524 and store it in the memory. In this process, the second overhead may be determined to be a sum of c1, c2, c3, and c4. The time c1 for the movement from the host memory region 520 to the accelerator memory region 530 may be determined by a ratio of a bandwidth between the host processor and the accelerator processor to a size of the related data 521. The time c3 for the movement of the compressed related data 523 (e.g., the compressed first partial data) from the accelerator memory region 530 to the host memory region 520 may be determined by a compression ratio of the moved related data 522 and the ratio of the bandwidth between the accelerator processor and the host processor.

In response to the first overhead being less than or equal to the second overhead, the host processor may perform the checkpointing operation. In response to the first overhead being greater than the second overhead, the accelerator processor may perform the checkpointing operation.

Figure 6:
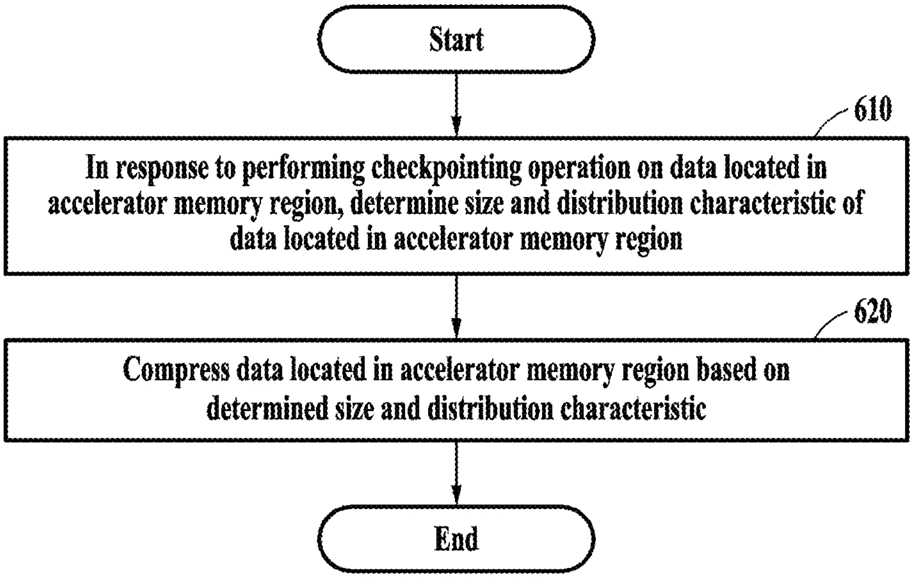
FIG. 6 illustrates an example operational flow of performing a checkpointing operation on related data according to one or more embodiments.

FIG. 6 illustrates an example operational flow of performing a checkpointing operation on related data according to one or more embodiments.

According to one or more embodiments, operations involved in a checkpointing operation to be performed on related data may be performed by a data processing device (e.g., the data processing device 1900 of FIG. 19, the data processing device 2000 of FIG. 20, and/or the data processing device 2100 of FIG. 21). Operations 610 to 620 to be described hereinafter may be performed sequentially in the order and manner as shown and described below with reference to FIG. 6, but the order of one or more of the operations may be changed, one or more of the operations may be omitted, and two or more of the operations may be performed in parallel or simultaneously without departing from the spirit and scope of the example embodiments described herein.

At operation 610, in response to performing a checkpointing operation on data located in an accelerator memory region, the data processing device may determine a size and a distribution characteristic of the data located in the accelerator memory region.

In an embodiment, the presence of related data (e.g., the related data 521 of FIG. 5B) may indicate that there is related data stored in the accelerator memory region (e.g., the accelerator memory region 530 of FIG. 5B). Alternatively or additionally, the presence of the related data may indicate that there is data moved to the accelerator memory region from a host memory region (e.g., the host memory region 520 of FIG. 5B). For example, in response to a determination that the related data is stored in the host memory region and that a processor corresponding to a smaller one of a first overhead and a second overhead is an accelerator processor, the data processing device may move the related data from the host memory region to the accelerator memory region and may then control the accelerator processor to perform the checkpointing operation on the related data.

At operation 620, the data processing device may compress the data located in the accelerator memory region based on the determined size and the determined distribution characteristic.

In this case, a compression method may be determined based on the size and the distribution characteristics of the data located in the accelerator memory region of the related data. The compression method may affect overhead, and thus varying the compression method based on the size and the distribution characteristic of the data located in the accelerator memory region may adjust the overhead. An example of the compression method will be described in more detail below with reference to FIGS. 7 through 13. The checkpointing operation may be performed in parallel in the accelerator memory region, and files generated by the checkpointing operation performed in parallel may be independent of each other. In this case, checkpointing operations performed in parallel in the accelerator memory region do not affect each other, and the respective files generated by the checkpointing operations performed in parallel may be independent of each other.

A separate file may be generated from compression performed on the data located in the accelerator memory region, and thus a synchronization overhead between compression operations may be removed.

Figure 7:
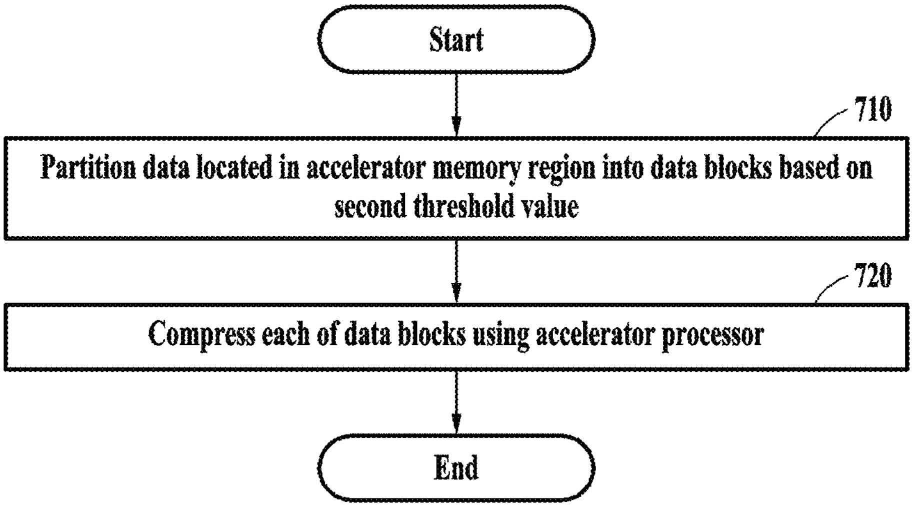
FIG. 7 illustrates an example operational flow of a data compression method according to one or more embodiments.

FIG. 7 illustrates an example operational flow of a data compression method according to one or more embodiments.

According to one or more embodiments, operations of a data compression method may be performed by a data processing device (e.g., the data processing device 1900 of FIG. 19, the data processing device 2000 of FIG. 20, and/or the data processing device 2100 of FIG. 21). Operations 710 to 720 to be described hereinafter may be performed sequentially in the order and manner as shown and described below with reference to FIG. 7, but the order of one or more of the operations may be changed, one or more of the operations may be omitted, and two or more of the operations may be performed in parallel or simultaneously without departing from the spirit and scope of the example embodiments described herein.

At operation 710, the data processing device may partition data located in an accelerator memory region into a plurality of data blocks based on a second threshold value. In response to a size of the data located in the accelerator memory region being greater than a first threshold value, and in response to a determined distribution characteristic indicating that the data located in the accelerator memory region is stored successively, the data processing device may partition the data located in the accelerator memory region into the plurality of data blocks based on the second threshold value greater than the first threshold value. For example, the first threshold value may be 10 gigabytes (GB), and the second threshold value may be greater than the first threshold value and less than an available memory size. At operation 720, the data processing device may compress each of the plurality of data blocks using an accelerator processor. An example of a compression method will be described in more detail below with reference to FIG. 8.

Figure 8:
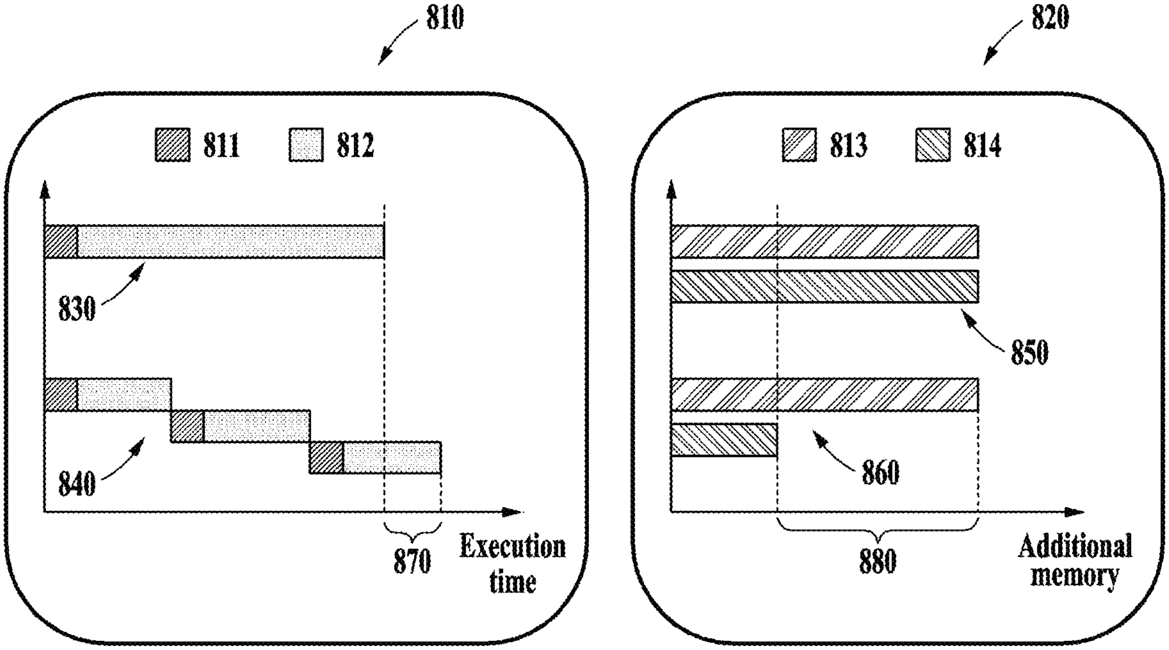
FIG. 8 illustrates an example of a data compression method according to one or more embodiments.

FIG. 8 illustrates an example of a data compression method according to one or more embodiments.

Referring to FIG. 8, table 810 shows a graph representing a time used for compression, and table 820 shows a graph representing a memory used for compression. In a case where an accelerator processor compresses a plurality of data blocks individually using a plurality of kernels, there may be differences in overhead and memory region.

In table 810, graph 830 shows a sum of a kernel operating overhead 811 and a compression time 812 at the kernel operating overhead 811 in a case where related data is not partitioned. Table 820 indicates a memory used to compress the related data. In this case, the memory used to compress the related data may include a memory 813 for compressing a time and an additional memory 814 for compressing data of the same size as the memory 813 for compressing the time.

Graph 840 shows a kernel operating overhead 811 and a compression time 812 at the kernel operating overhead 811 in a case where related data is partitioned into a plurality of data blocks. Table 820 indicates a memory used to compress the related data. The memory used to compress the related data may include a memory 813 for compressing a time and an additional memory 814 for compressing data of a smaller size than the memory 813 for compressing the time.

In the case where the related data is partitioned into the plurality of data blocks, an accelerator processor may compress each of the plurality of data blocks. For example, the accelerator processor may compress the plurality of data blocks (e.g., metadata) individually using a plurality of kernels.

The kernel operating overhead 811 used when the related data is partitioned into the plurality of data blocks may differ by a time 870 from the kernel operating overhead 811 used when the related data is not partitioned. In this case, the difference from the kernel operating overhead 811 may be associated with the number of memory regions used in a compression process.

A memory region 860 used when the related data is partitioned into the plurality of data blocks may differ by an additional memory 880 from a memory region 850 used when the related data is not partitioned. This compression method of one or more embodiments may add an overhead but reduce an additionally required amount of memory.

Figure 9:
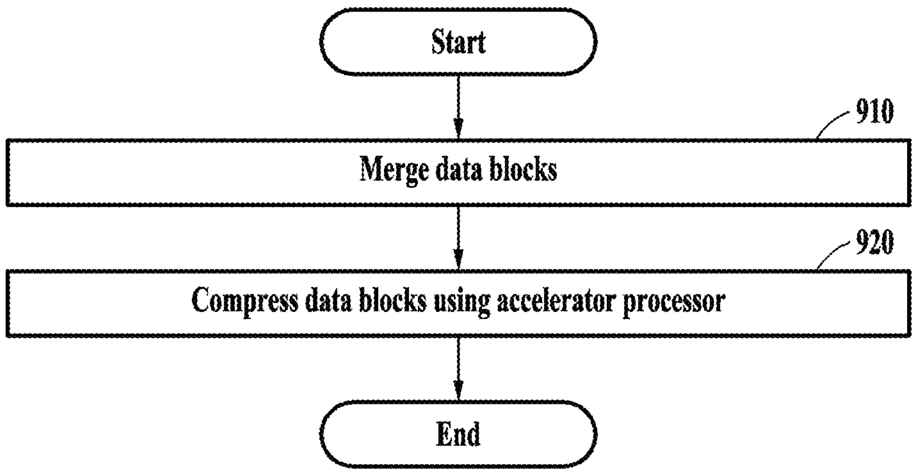
FIG. 9 illustrates an example operational flow of a data compression method according to one or more embodiments.

FIG. 9 illustrates an example operational flow of a data compression method according to one or more embodiments.

According to one or more embodiments, operations of a data compression method may be performed by a data processing device (e.g., the data processing device 1900 of FIG. 19, the data processing device 2000 of FIG. 20, and/or the data processing device 2100 of FIG. 21). Operations 910 to 920 to be described hereinafter may be performed sequentially in the order and manner as shown and described below with reference to FIG. 9, but the order of one or more of the operations may be changed, one or more of the operations may be omitted, and two or more of the operations may be performed in parallel or simultaneously without departing from the spirit and scope of the example embodiments described herein At operation 910, the data processing device may merge a plurality of data blocks. In response to a distribution characteristic indicating that storage locations of the plurality of data blocks are proximate to each other, the data processing device may merge the plurality of data blocks.

At operation 920, the data processing device may compress the plurality of data blocks using an accelerator processor. The data processing device may use the accelerator processor to compress the plurality of data blocks. In this case, a size of the plurality of data blocks may be less than a third threshold value. The third threshold value may be, but is not limited to, 10 megabytes (MB), or the third threshold value may be any other value.

In this case, to compress a merged data block, only a single kernel may operate, and thus the data processing device of one or more embodiments may reduce a kernel operating overhead, and thus may reduce a compression time. An example of a compression method based on merging a plurality of data blocks will be described in more detail below with reference to FIG. 10.

Figure 10:
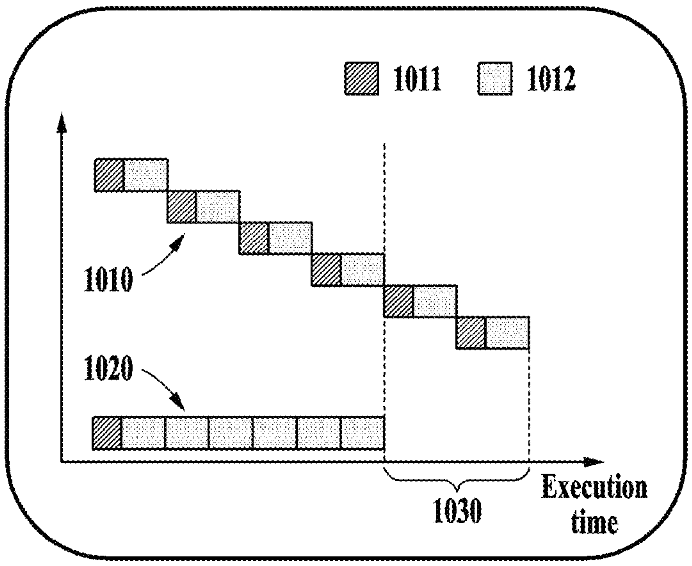
FIG. 10 illustrates an example of a data compression method according to one or more embodiments.

FIG. 10 illustrates an example of a data compression method according to one or more embodiments.

Referring to FIG. 10, a merged data block 1020 acquired as a plurality of data blocks 1010 are merged may be compressed. To compress the plurality of data blocks 1010, a plurality of kernels may operate, or the same kernel may operate multiple times, which may include performing compression on related data in a plurality of memory regions individually. In this case, overhead may be relatively greater than overhead incurred in a case where only a single kernel operates.

However, to compress the merged data block 1020, only a single kernel may operate to compress the related data, and thus the data processing device of one or more embodiments may compress the merged data block 1020 in a merged memory region, and thus may reduce a kernel operating overhead.

Figure 11:
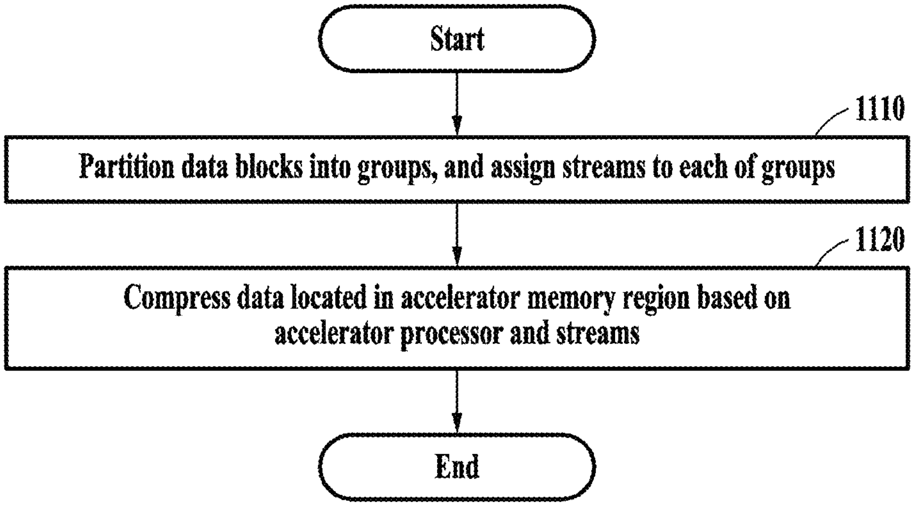
FIG. 11 illustrates an example operational flow of a data compression method according to one or more embodiments.

FIG. 11 illustrates an example operational flow of a data compression method according to one or more embodiments. Operations 1110 to 1120 to be described hereinafter may be performed sequentially in the order and manner as shown and described below with reference to FIG. 11, but the order of one or more of the operations may be changed, one or more of the operations may be omitted, and two or more of the operations may be performed in parallel or simultaneously without departing from the spirit and scope of the example embodiments described herein.

According to one or more embodiments, operations of a data compression method may be performed by a data processing device (e.g., the data processing device 1900 of FIG. 19, the data processing device 2000 of FIG. 20, and/or the data processing device 2100 of FIG. 21).

At operation 1110, the data processing device may partition a plurality of data blocks into a plurality of groups and assign a plurality of streams to each of the plurality of groups.

For example, in response to a distribution characteristic indicating that the plurality of data blocks is sparsely distributed, the data processing device may partition the plurality of data blocks into the plurality of groups and assign the plurality of streams to each of the plurality of groups.

In an embodiment, the distribution characteristic may involve a size of a plurality of sparsely distributed memory regions. In response to the size of the plurality of sparsely distributed memory regions being less than a threshold size (e.g., 10 MB), the data processing device may partition the plurality of data blocks into the plurality of groups and assign the plurality of streams to each of the plurality of groups.

At operation 1120, the data processing device may compress data located in an accelerator memory region based on an accelerator processor and the plurality of streams. An example of a compression method of compressing data based on a distribution characteristic and a plurality of streams will be described in more detail below with reference to FIG. 12.

Figure 12:
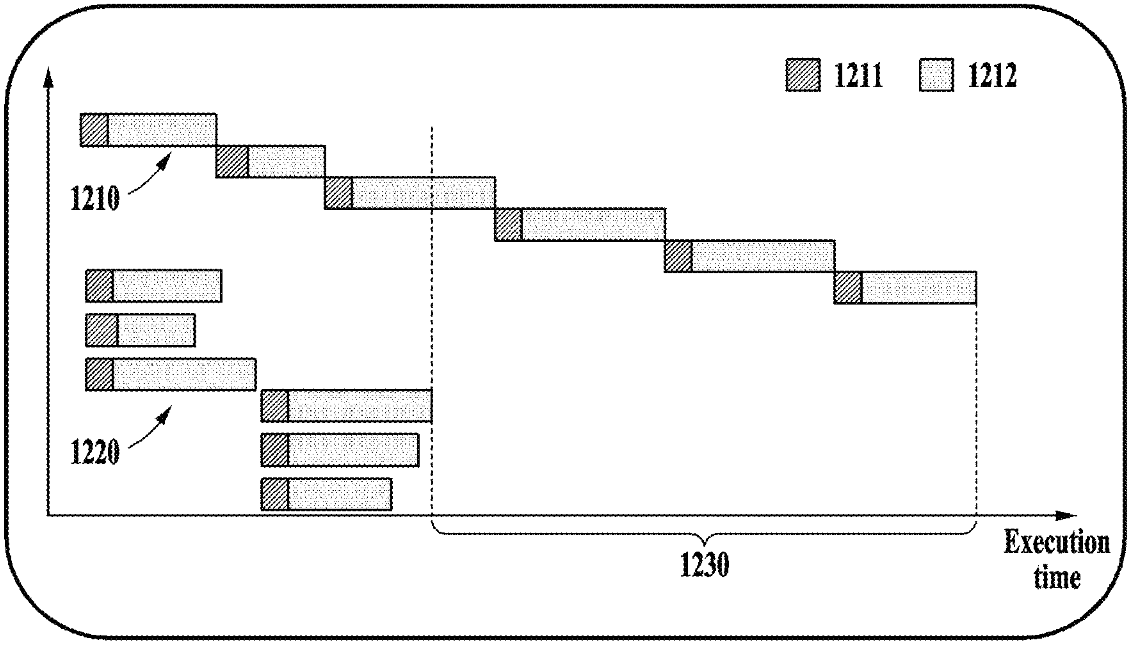
FIG. 12 illustrates an example of a data compression method according to one or more embodiments.

FIG. 12 illustrates an example of a data compression method according to one or more embodiments.

Referring to FIG. 12, a data processing device may compress data based on a distribution characteristic and a plurality of streams. For example, in a case 1210 where a plurality of data blocks present in a plurality of distributed memory regions is not grouped, a plurality of kernels may be activated sequentially to compress related data in each of the plurality of sparsely distributed memory regions. This may use a kernel operating overhead 1211 by the plurality of kernels and a compression time 1212 in the plurality of sparsely distributed memory regions.

In a case 1220 where a plurality of sparsely distributed data blocks is grouped, compressing related data included in a plurality of groups using a plurality of streams may increase a compression speed and reduce a compression time.

A compression method used in the case 1220 where the plurality of sparsely distributed data blocks is grouped may reduce a compression time by a time 1230, compared to a compression method used in the case 1210 where the plurality of data blocks in the plurality of distributed memory regions is not grouped. The compression method used in the case 1220 where the plurality of sparsely distributed data blocks is grouped may be used when an additionally available amount of memory is limited.

Figure 13:
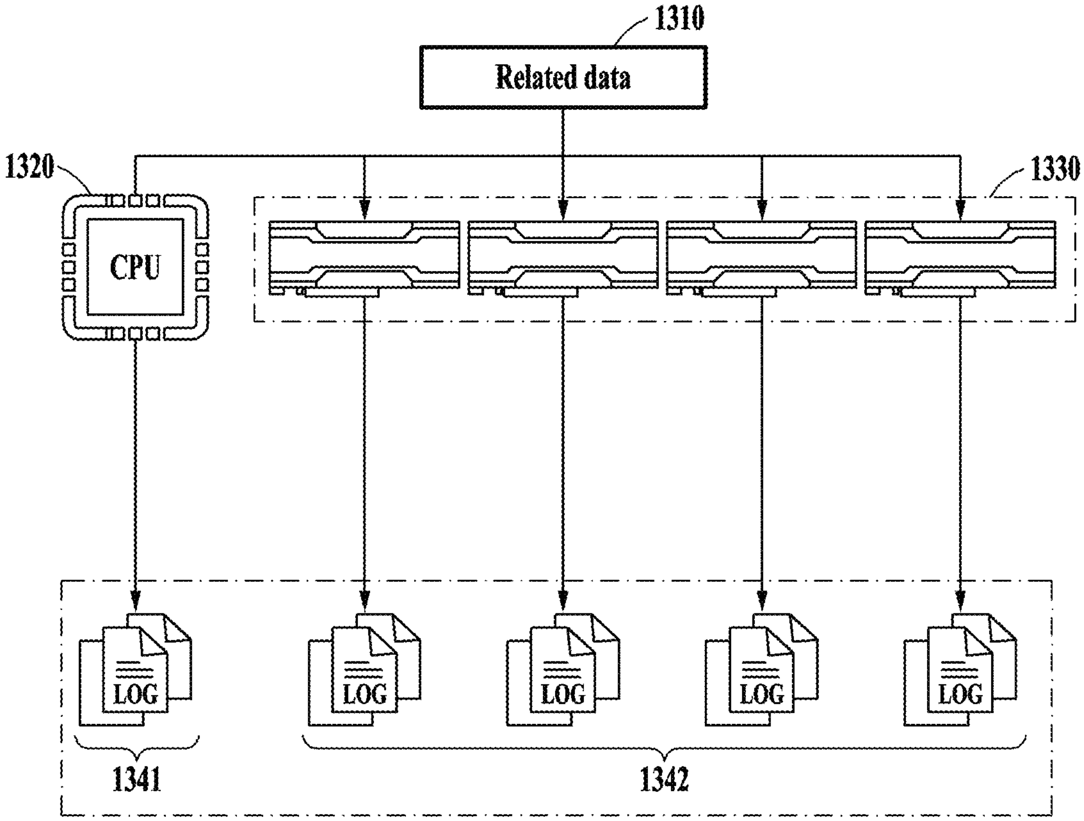
FIG. 13 illustrates an example of generating a checkpoint file by data compression according to one or more embodiments.

FIG. 13 illustrates an example of generating a checkpoint file by data compression according to one or more embodiments.

Referring to FIG. 13, a data processing device (e.g., the data processing device 1900 of FIG. 19, the data processing device 2000 of FIG. 20, and/or the data processing device 2100 of FIG. 21) may perform checkpointing operations in parallel. In this case, respective files generated by the checkpointing operations performed in parallel may be independent of each other. In an embodiment, related data 1310 may include first partial data and second partial data. The first partial data may include data corresponding to stack, heap, and library (or "libs"). The second partial data may include data corresponding to runtime data and memory regions.

The first partial data may be input to a host processor 1320, and the second partial data may be input to accelerator processors 1330. The host processor 1320 (e.g., a CPU) may perform a checkpointing operation on the first partial data, and the accelerator processors 1330 (e.g., GPUs) may perform checkpointing operations on the second partial data. The host processor 1320 may generate a corresponding checkpoint file 1341 by performing the checkpointing operation on the first partial data. The checkpointing operations performed by the accelerator processors 1330 on the second partial data may be performed in parallel. In this case, the data processing device of one or more embodiments may generate separate checkpoint files 1342 by the respective compression operations on the second partial data, thereby removing a synchronization overhead between compression operations. The checkpoint files 1342 generated by the accelerator processors 1330 may be used in an input/output (I/O) system based on GPUDirect technology.

The host processor 1320 (e.g., the CPU) may compress the first partial data using a "gzip" compression algorithm or a "zstd" compression algorithm. The accelerator processors 1330 (e.g., the GPUs) may compress the second partial data by invoking (or calling) a kernel (e.g., an "ans" kernel, a "bitcomp" kernel, a "snappy" kernel, etc.).

Figure 14:
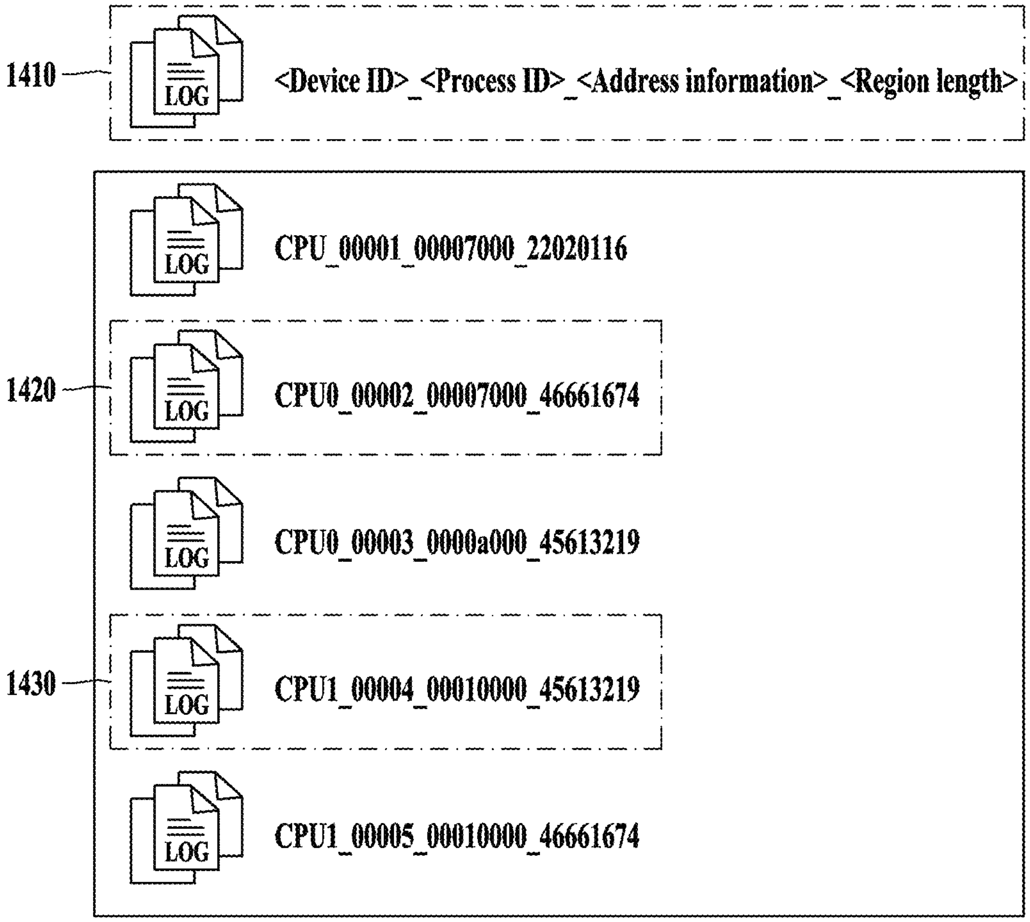
FIG. 14 illustrates an example of a checkpoint file according to one or more embodiments.

FIG. 14 illustrates an example of a checkpoint file according to one or more embodiments.

Referring to FIG. 14, a checkpoint file name 1410 may be determined based on a device identifier (ID), a process ID, address information, and a region length. For example, a file name 1420 may be a device ID (e.g., CPU), a process ID (e.g., 00001), address information (e.g., 00007000), and a region length (e.g., 22020116). A file name 1430 may be a device ID (e.g., CPU1), a process ID (e.g., 00004), address information (e.g., 00010000), and a region length (e.g., 45613219). A method of determining a checkpoint file name is not limited to the example described above but may be determined by any attribute characteristics of related data and/or compressed file. In a case where a checkpointing operation is performed based on a compressed file, a restoration operation may be performed using the name of the compressed file.

Figure 15:
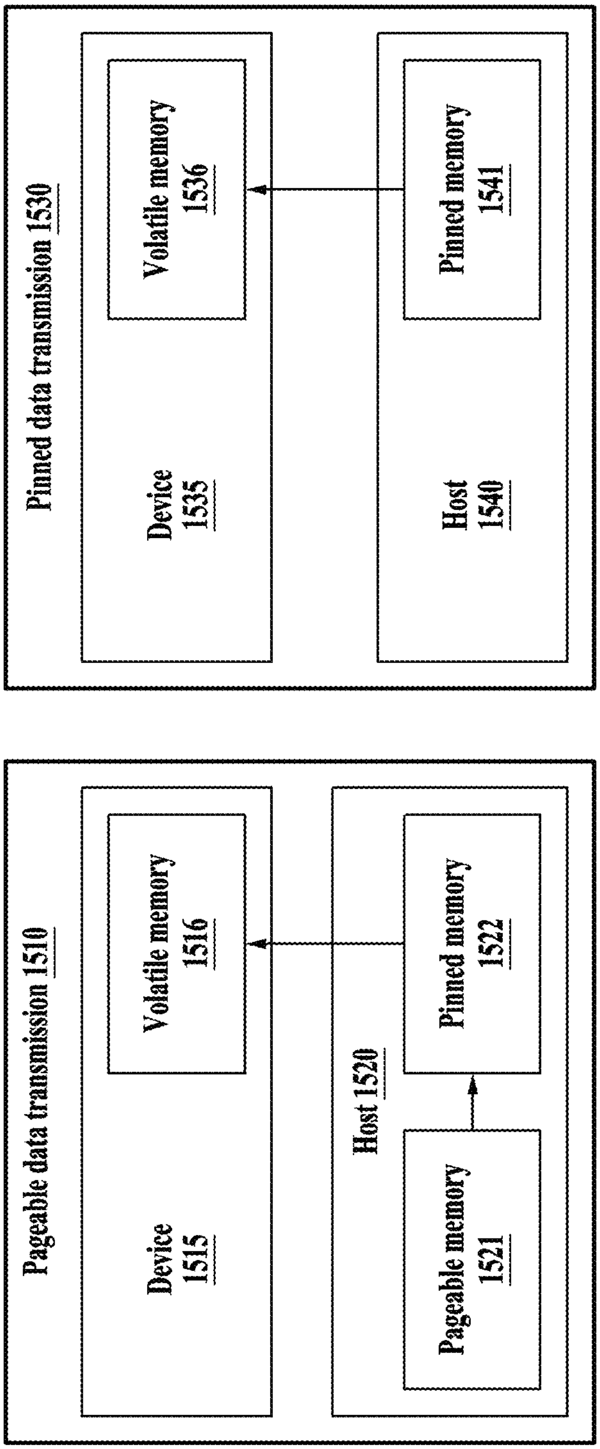
FIG. 15 illustrates an example of data movement between a host and a device according to one or more embodiments.

FIG. 15 illustrates an example of data movement between a host and a device according to one or more embodiments.

Referring to FIG. 15, pageable data transmission 1510 may involve a device 1515 and a host 1520. The device 1515 may include a volatile memory 1516. The host 1520 may include a pageable memory 1521 and a pinned memory 1522. The device 1515 may be an accelerator or an accelerator processor (e.g., a GPU), and the volatile memory 1516 may be a dynamic random-access memory (DRAM). In this case, pageable data may be transmitted from the pageable memory 1521 to the pinned memory 1522 and may then be transmitted from the pinned memory 1522 to the volatile memory 1516 of the device 1515.

As shown, pinned data transmission 1530 may involve a device 1535 and a host 1540. The device 1535 may include a volatile memory 1536, and the host 1540 may include a pinned memory 1541. The device 1535 may be an accelerator or an accelerator processor (e.g., a GPU), and the volatile memory 1536 may be a DRAM. In this case, pinned data may be transmitted from the pinned memory 1541 to the volatile memory 1536 of the device 1535.

Figure 16:
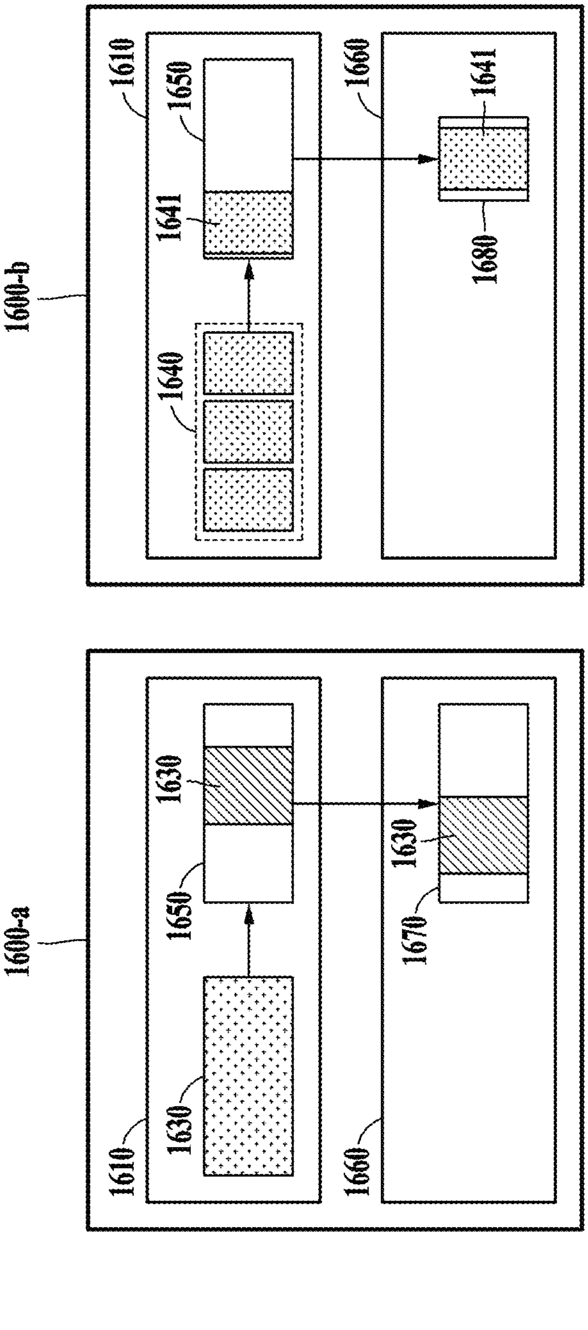
FIG. 16 illustrates an example of data movement between a host and a device according to one or more embodiments.

FIG. 16 illustrates an example of data movement between a host and a device according to one or more embodiments.

Referring to FIG. 16, pinned data transmission 1600-*a* may refer to a transmission of data 1630 of a device 1610 that is not partitioned or grouped. In this case, the data 1630 may be stored in a volatile memory 1650 (e.g., a DRAM). The data 1630 stored in the volatile memory 1650 may be transmitted to a host 1660, and the data 1630 transmitted to the host 1660 may be stored in a pinned memory 1670.

As shown, pinned data transmission 1600-*b* may refer to a transmission of data 1640 of a device 1610 that is partitioned or grouped. In this case, an entirety or portion (e.g., partial data 1641) of the partitioned or grouped data 1640 may be stored in a volatile memory 1650 (e.g., a DRAM). The entirety or portion (e.g., the partial data 1641) of the partitioned or grouped data 1640 stored in the volatile memory 1650 may be stored in a host 1660, and the entirety or portion (e.g., the partial data 1641) of the partitioned or grouped data 1640 stored in the host 1660 may be stored in a pinned memory 1680. By storing the entirety or portion (e.g., the partial data 1641) of the partitioned or grouped data 1640 in the pinned memory 1680, the data processing device of one or more embodiments may increase the usage efficiency of the pinned memory 1680.

Figure 17:
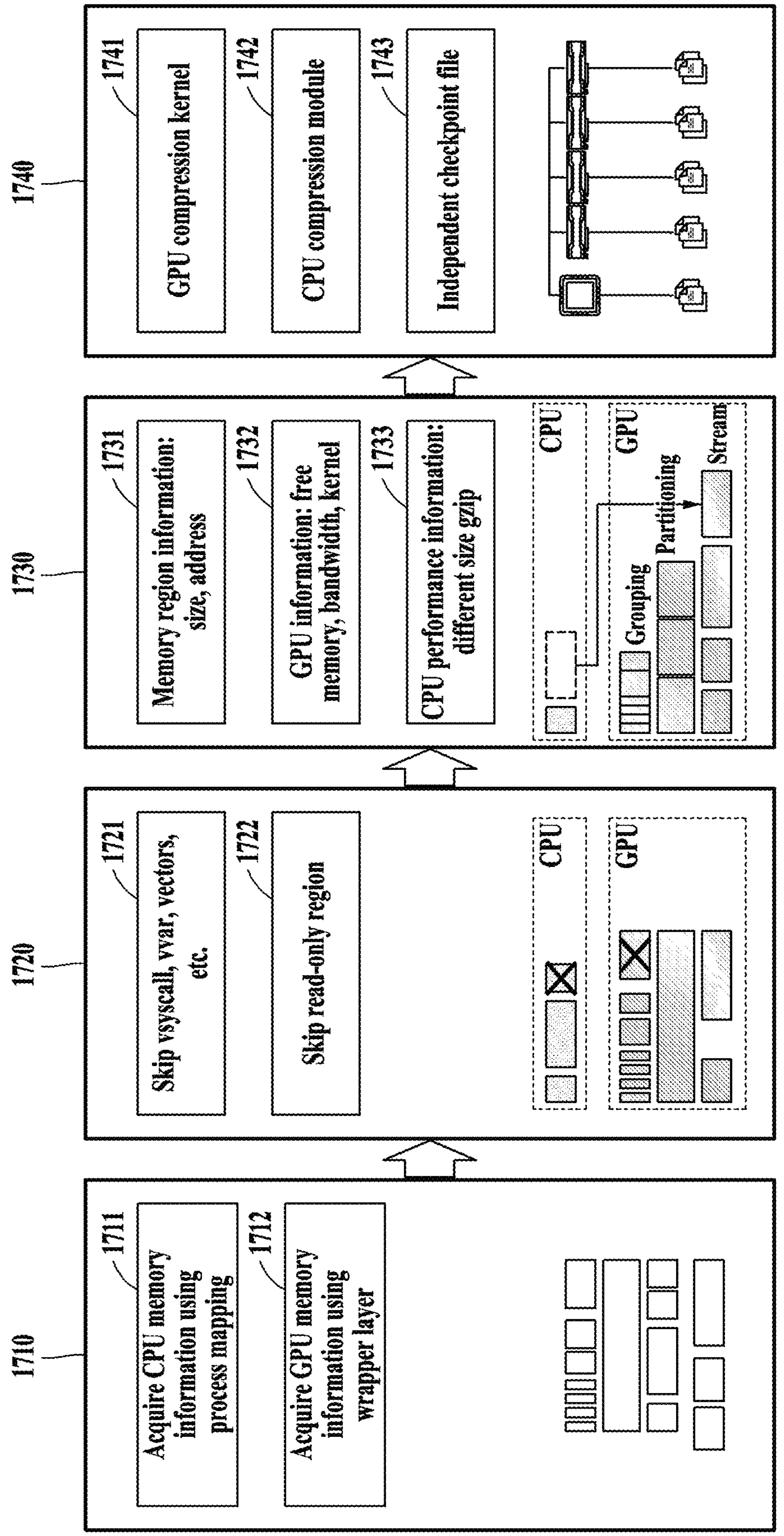
FIG. 17 illustrates an example of a data processing method with a checkpointing operation according to one or more embodiments.

FIG. 17 illustrates an example of a data processing method with a checkpointing operation according to one or more embodiments.

Referring to FIG. 17, a checkpointing operation may include steps 1710, 1720, 1730, and 1740. Step 1710 may include operation 1711 of acquiring memory information (e.g., CPU memory information) of a host processor region using a process mapping and operation 1712 of acquiring memory information (e.g., GPU memory information) of an accelerator processor region using a wrapper layer. An image included in step 1710 shows memory regions collected to be used for a process of an application.

In step 1720, filtering may be performed on the memory regions to perform the checkpointing operation. For example, step 1720 may include operation 1721 of excluding (or skipping) "vsyscall," "vvar," "vectors," or the like from memory region information and operation 1722 of excluding (or skipping) a read-only region. An image included in step 1720 shows memory information, of the memory information of the host processor region and the memory information of the accelerator processor region from which the "vsyscall," "vvar," and "vectors" information or the read-only region information is excluded.

In step 1730, the memory regions may be arranged or reconfigured. For example, the memory regions may be arranged or reconfigured based on at least one of memory region information 1731 (e.g., memory size and memory address, etc.), GPU information 1732 (e.g., free memory, bandwidth, kernel, etc.), and CPU performance information 1733 (e.g., compression process (gzip) performance information of different sizes). An image included in step 1730 shows examples of the arrangement or reconfiguration of the memory regions. The examples of the arrangement or reconfiguration of the memory regions may include grouping related data, partitioning the related data into a plurality of data blocks, grouping the partitioned data blocks, and assigning a plurality of streams to each group.

In step 1740, data (e.g., the related data) may be compressed, and the compressed data may be maintained independently. For example, the data may be compressed in parallel by at least one of a GPU compression kernel 1741 or a CPU compression module 1742. The compressed data may be maintained as an independent checkpoint file 1743. An image included in step 1740 shows the same image as the image shown in FIG. 13, and thus the description thereof will not be repeated.

Figure 18:
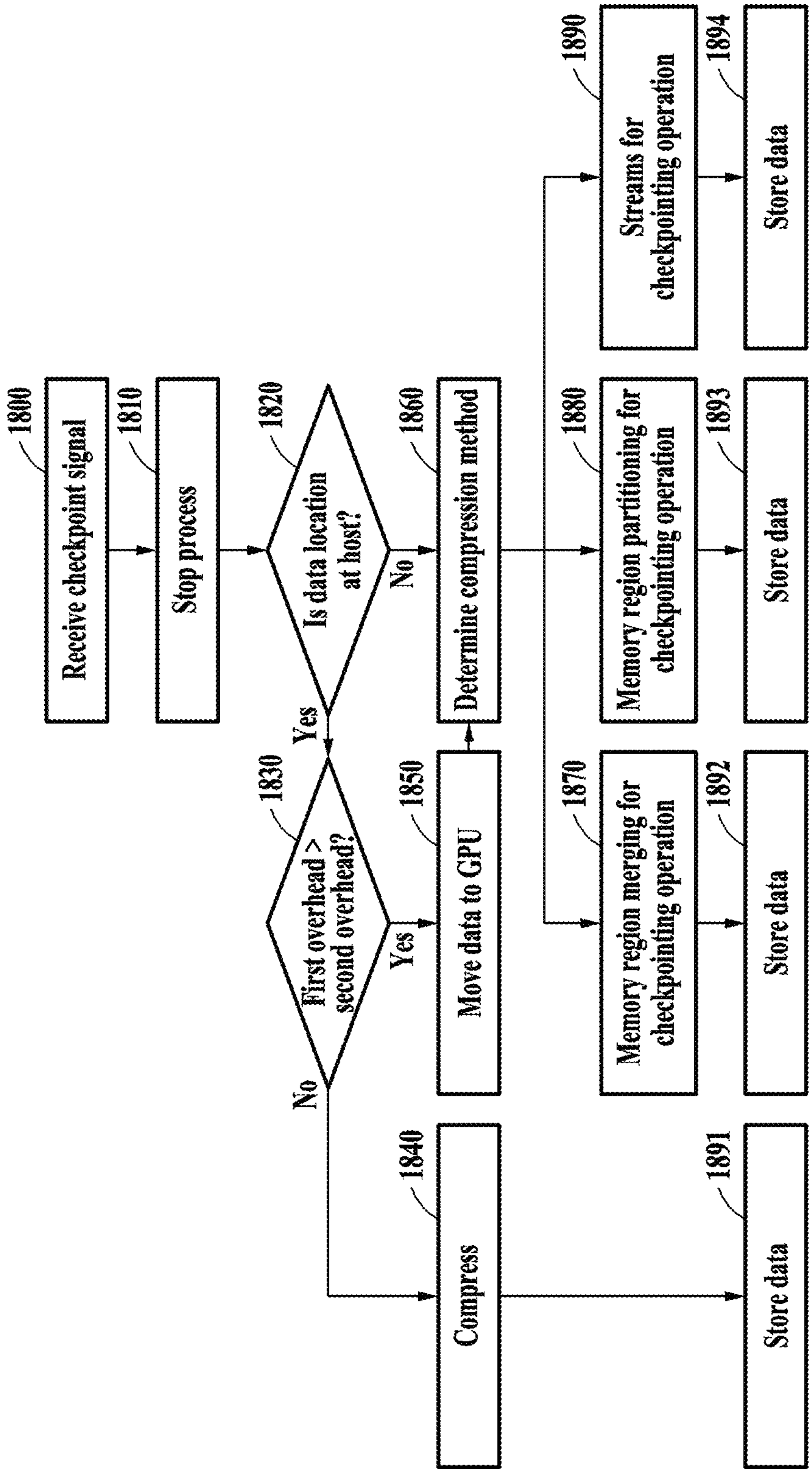
FIG. 18 illustrates an example operational flow of a data processing method with a checkpointing operation according to one or more embodiments.

FIG. 18 illustrates an example operational flow of a data processing method with a checkpointing operation according to one or more embodiments.

According to one or more embodiments, operations of a data processing method with a checkpointing operation may be performed by a data processing device (e.g., the data processing device 1900 of FIG. 19, the data processing device 2000 of FIG. 20, and/or the data processing device 2100 of FIG. 21). Operations 1800 to 1894 to be described hereinafter may be performed sequentially in the order and manner as shown and described below with reference to FIG. 18, but the order of one or more of the operations may be changed, one or more of the operations may be omitted, and two or more of the operations may be performed in parallel or simultaneously without departing from the spirit and scope of the example embodiments described herein.

At operation 1800, a checkpoint signal may be received.

At operation 1810, a process may be stopped. For example, a process and/or a process of a program or thread, which is a target of a checkpointing operation, may be stopped.

In response to a location of data being in a host memory region (e.g., "Yes" at operation 1820), and in response to a first overhead being less than or equal to a second overhead (e.g., "No" at operation 1830), the data may be compressed and stored at operations 1840 and 1891.

The data (e.g., related data) may be data corresponding to the process, program, or thread that is the target of the checkpointing operation. The location of the data may be acquired by scanning a memory region for each process, and the location of the data may indicate whether the data is in a memory region of a host processor or a memory region of an accelerator processor.

The first overhead at operation 1830 may represent an overhead that may be incurred in a process of performing the checkpointing operation using the host processor (e.g., a CPU), and the second overhead at operation 1830 may represent an overhead that may be incurred in a process of performing the checkpointing operation using the accelerator processor (e.g., a GPU).

At operation 1840, the data (e.g., the process or thread) may be compressed using the host processor. In response to the data included in the memory region of the host processor being less than a predetermined size (e.g., 1 GB), the data processing device of one or more embodiments may reduce the overhead by compressing the data using the host processor.

In response to the location of the data being in the host memory region (e.g., "Yes" at operation 1820), and in response to the first overhead being greater than the second overhead (e.g., "Yes" at operation 1830), the data may be moved to the accelerator processor (e.g., the GPU) at operation 1850. The data moved to the accelerator processor may be compressed after a compression method is determined. An example of the compression method will be described below in connection with operation 1860.

In response to the location of the data not being in the host memory region (e.g., "No" at operation 1820), the compression method may be determined at operation 1860. At operation 1860, the compression method may be determined even though the data in the memory region of the host processor has been moved to an accelerator memory region at operation 1850.

The compression method may be determined based on a size or a distribution characteristic of the data located in the accelerator memory region. For example, in response to the size of the data located in the accelerator memory region being less than a first threshold value, compression may be performed based on merging the data. In response to the size of the data located in the accelerator memory region being greater than the first threshold value and being less than a second threshold value, compression may be performed based on partitioning the data. Alternatively, in response to the data located in the accelerator memory region being sparsely distributed, compression of the data may be performed using a plurality of streams.

At operations 1870 and 1892, memory region merging for the checkpointing operation may be performed, and the data on which the checkpointing operation has been performed may be stored. The memory region merging may be performed by merging the data for the checkpointing operation. In response to the size of the data located in the accelerator memory region being less than the first threshold value, compression may be performed based on merging the data, and the compressed data may be stored. In this case, as the data is merged, the accelerator memory region may be merged. A compression kernel (e.g., a GPU compression kernel) of the accelerator processor may be arranged in the merged accelerator memory region. An example of a method of compressing data based on merged data has been described above with reference to FIGS. 9 and 10, and the description thereof will not be repeated.

At operations 1880 and 1893, memory region partitioning for the checkpointing operation may be performed, and the data on which the checkpointing operation has been performed may be stored. The memory region partitioning may be performed by partitioning the data for the checkpointing operation. In response to the size of the data located in the accelerator memory region being greater than the first threshold value and being less than the second threshold value, compression may be performed based on partitioning the data, and the compressed data may be stored. As the data is partitioned, the accelerator memory region may be partitioned. An accelerator processor compression kernel (e.g., a GPU compression kernel) may be assigned to the partitioned accelerator memory region. An example of a method of compressing data based on partitioned data has been described above with reference to FIGS. 7 and 8, and the description thereof will not be repeated.

At operations 1890 and 1894, a plurality of streams may be assigned for the checkpointing operation, and the data on which the checkpointing operation has been performed may be stored. For example, in a case where a plurality of data blocks in a plurality of distributed memory regions is not grouped, the data in the plurality of sparsely distributed memory regions may be compressed by sequentially activating a plurality of kernels. An example of a method of compressing data based on a plurality of streams has been described above with reference to FIGS. 11 and 12, and the description thereof will not be repeated.

FIG. 19 illustrates an example of a data processing device according to one or more embodiments.

Referring to FIG. 19, a data processing device 1900 may include a positioning module 1910 and a checkpointing module 1920.

In response to receiving a checkpoint signal, the positioning module 1910 may determine a location of related data of an application in a memory region. The location of the related data in the memory region may include a location in at least one of a host memory region or an accelerator memory region.

Based on the location of the related data in the memory region, the checkpointing module 1920 may perform a checkpointing operation on the related data through at least one a host processor or an accelerator processor.

To perform the checkpointing operation, the data processing device 1900 may perform data processing (e.g., compression) associated with the checkpointing operation. For example, the data processing device 1900 may compress the related data through the at least one of the host processor and/or the accelerator processor that has performed the checkpointing operation. An example of the data processing device 1900 will be described in more detail below with reference to FIG. 20.

FIG. 20 illustrates an example of a data processing device according to one or more embodiments.

Referring to FIG. 20, a data processing device 2000 may include a memory 2010 (e.g., one or more memories) and a processor 2020 (e.g., one or more processors). The data processing device 2000 may correspond to the data processing device 1900 of FIG. 19.

The memory 2010 may store instructions that may be executed by the processor 2020. The memory 2010 may store the instructions executable by the processor 2020. The instructions executable by the processor 2020 may, when executed by the processor 2020, allow the processor 2020 to cause the data processing device 2000 to perform a checkpointing operation. For example, the memory 2010 may be or include a non-transitory computer-readable storage medium storing instructions that, when executed by the processor 2020, configure the processor 2020 to perform any one, any combination, or all of the operations and/or methods disclosed herein with reference to FIGS. 1-19. The memory 2010 may be integrated with the processor 2020. For example, a random-access memory (RAM) or a flash memory may be arranged in an integrated circuit microprocessor or the like. Additionally, the memory 2010 may include a separate device, such as, an external disk drive, a storage array, and/or other storage device available to a database (DB) system. The memory 2010 and the processor 2020 may be operatively coupled or otherwise communicate with each other via I/O ports, network connections, or the like, such that the processor 2020 may read files stored in the memory 2010. The memory 2010 may be a non-transitory computer-readable storage medium storing instructions, and the instructions stored in the memory 2010 may, when executed by the processor 2020, prompt the processor 2020 to execute any one, any combination, or all of the data processing operations and/or methods disclosed herein with reference to FIGS. 1-19.

As described above, or in addition to the descriptions above, examples of the non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (e.g., secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any related data (or associated data), data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

The processor 2020 may execute the instructions stored in the memory 2010. The processor 2020 may include, as non-limiting examples, a CPU, a GPU, an NPU, a media processing unit (MPU), a data processing unit (DPU), a vision processing unit (VPU), a video processor, an image processor, a display processor, a microprocessor, a processor core, a multi-core processor, an application-specific integrated circuit (ASIC), a field-programmable gate array (FPGA), and/or any combination thereof.

In response to receiving a checkpoint signal, the processor 2020 may determine a location of related data of an application in a memory region, perform a checkpointing operation on the related data through at least one of a host processor or an accelerator processor based on the location of the related data in the memory region, and compress the related data through the at least one of the host processor and/or the accelerator processor that has performed the checkpointing operation. The location of the related data in the memory region may include a location in at least one of a host memory region or an accelerator memory region.

In response to first partial data of the related data being in the host memory region, the processor 2020 may determine a first overhead for performing the checkpointing operation on the first partial data by the host processor, determine a second overhead for performing the checkpointing operation on the first partial data by the accelerator processor, perform the checkpointing operation on the first partial data by a processor corresponding to a smaller one of the first overhead and the second overhead, and in response to second partial data of the related data being in the accelerator memory region, perform the checkpointing operation on the second partial data by the accelerator processor.

In response to performing, using the accelerator processor, the checkpointing operation on data located in the accelerator memory region of the related data, the processor 2020 may determine a size and a distribution characteristic of the data located in the accelerator memory region, and compress the data located in the accelerator memory region based on the determined size and the determined distribution characteristic.

In response to the size of the data located in the accelerator memory region being greater than a first threshold value, and in response to the determined distribution characteristic indicating that the data located in the accelerator memory region is stored successively, the processor 2020 may partition the data located in the accelerator memory region into a plurality of data blocks based on a second threshold value greater than the first threshold value, and compress each of the plurality of data blocks using the accelerator processor.

The data located in the accelerator memory region may include the plurality of data blocks. In this case, in response to the distribution characteristic indicating that storage locations of the plurality of data blocks are proximate to each other, the processor 2020 may merge the plurality of data blocks and compress the plurality of data blocks using the accelerator processor. The size of the plurality of data blocks may be less than a third threshold value.

The data located in the accelerator memory region may include the plurality of data blocks. In this case, in response to the distribution characteristic indicating that the plurality of data blocks is sparsely distributed, the processor 2020 may partition the plurality of data blocks into a plurality of groups, assign a plurality of streams to each of the plurality of groups, and compress the data located in the accelerator memory region based on the accelerator processor and the plurality of streams.

The processor 2020 may perform checkpointing operations in parallel. In this case, respective files generated by the checkpointing operations performed in parallel may be independent of each other.

FIG. 21 illustrates an example of a data processing device according to one or more embodiments.

Referring to FIG. 21, a data processing device 2100 may include a host processor 2110 (e.g., one or more processors), a memory 2120 (e.g., one or more memories), and an accelerator 2130 (e.g., one or more accelerators). The host processor 2110, the memory 2120, and the accelerator 2130 may communicate with one another through a bus, a network on a chip (NoC), and/or a peripheral component interconnect express (PCIe). In the example of FIG. 21, only the components related to the example described herein are illustrated as being included in the data processing device 2100. Thus, the data processing device 2100 may also include other general-purpose components in addition to the components illustrated in FIG. 21.

The host processor 2110 may perform overall functions for controlling the data processing device 2100. The host processor 2110 may refer to a processor included in the host and may include, but is not limited to, a central processing unit (CPU). The host processor 2110 may generally control the data processing device 2100 by executing programs and/or instructions stored in the memory 2120. For example, the memory 2120 may include a non-transitory computer-readable storage medium storing instructions that, when executed by the processor 2110, configure the processor 2110 to perform any one, any combination, or all of operations and/or methods of the host processors disclosed herein with reference to FIGS. 1-20. The host processor 2110 may be implemented as a central processing unit (CPU), a graphics processing unit (GPU), and/or an application processor (AP), which is included in the data processing device 2100, but examples are not limited thereto.

The memory 2120 may be hardware for storing data having been processed or to be processed by the data processing device 2100. In addition, the memory 2120 may store an application, a driver, and the like to be driven by the data processing device 2100. The memory 2120 may include a volatile memory (e.g., dynamic random-access memory (DRAM)) and/or a non-volatile memory.

The data processing device 2100 may include the accelerator 2130 for an operation. The accelerator 2130 may process tasks that may be more efficiently processed by a separate exclusive device (e.g., the accelerator 2130) than by the general-purpose host processor 2110, due to the characteristics of the tasks. Here, one or more processing elements (PEs) included in the accelerator 2130 may be utilized. The accelerator 2130 may include a separate exclusive accelerator processor 2140 (e.g., one or more accelerator processors). The accelerator processor 2140 may refer to a processor included in the accelerator 2130 and may include, but is not limited to, a graphics processing unit (GPU), a neural processing unit (NPU), and/or a tensor processing unit (TPU). In addition, the accelerator 2130 may include a separate exclusive memory 2150. The memory 2150 may communicate with the accelerator processor 2140 and may correspond to a memory of a high bandwidth (e.g., a high bandwidth memory (HBM)) for use with the accelerator processor 2140. According to an example, the memory 2150 may include a plurality of pseudo channels (PCs) and may perform a processing in memory (PIM) operation using the plurality of PCs.

The host processors, accelerator processors, devices, volatile memories, hosts, pageable memories, pinned memories, data processing devices, positioning modules, checkpointing modules, memories, processors, accelerators, host processor 1320, accelerator processors 1330, device 1515, volatile memory 1516, host 1520, pageable memory 1521, pinned memory 1522, device 1535, volatile memory 1536, host 1540, pinned memory 1541, device 1610, volatile memory 1650, host 1660, pinned memory 1670, pinned memory 1680, data processing device 1900, positioning module 1910, checkpointing module 1920, data processing device 2000, memory 2010, processor 2020, data processing device 2100, host processor 2110, memory 2120, accelerator 2130, memory 2150, and accelerator processor 2140 described herein, including descriptions with respect to respect to FIGS. 1-21, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-21 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An electronic device with data processing, the electronic device comprising:
- one or more processors configured to:
  - in response to receiving a checkpoint signal, determine a location of related data of an application in a memory region;
  - select one of a host processor and an accelerator processor based on the location of the related data in the memory region;
  - perform a checkpointing operation on the related data using the selected processor; and
  - compress the related data using the selected processor that has performed the checkpointing operation,
- wherein the location of the related data in the memory region comprises a location in either one or both of a host memory region and an accelerator memory region.

2. The electronic device of claim 1, wherein, for the performing of the checkpointing operation, the one or more processors are configured to:
- in response to first partial data of the related data being in the host memory region, determine a first overhead for performing the checkpointing operation on the first partial data using the host processor;
- determine a second overhead for performing the checkpointing operation on the first partial data using the accelerator processor;
- perform the checkpointing operation on the first partial data using a processor corresponding to a smaller one between the first overhead and the second overhead; and
- in response to second partial data of the related data being in the accelerator memory region, perform the checkpointing operation on the second partial data using the accelerator processor.

3. The electronic device of claim 2, wherein
- the first overhead comprises a time for the host processor to compress the first partial data and a time for the host processor to store the compressed first partial data in the memory, and
- the second overhead comprises a time for moving the first partial data from the host memory region to the accelerator memory region, a time for compressing the moved first partial data, a time for moving the compressed first partial data from the accelerator processor to the host processor, and a time for storing the compressed first partial data in the memory.

4. The electronic device of claim 1, wherein, for the compressing, the one or more processors are configured to:
- in response to performing the checkpointing operation using the accelerator processor on data located in the accelerator memory region of the related data, determine a size and a distribution characteristic of the data located in the accelerator memory region; and
- compress the data located in the accelerator memory region based on the determined size and the determined distribution characteristic.

5. The electronic device of claim 4, wherein, for the compressing, the one or more processors are configured to:
- in response to the determined size of the data located in the accelerator memory region being greater than a first threshold value, and in response to the determined distribution characteristic indicating that the data located in the accelerator memory region is stored successively, partition the data located in the accelerator memory region into a plurality of data blocks based on a second threshold value greater than the first threshold value; and
- compress each of the plurality of data blocks using the accelerator processor.

6. The electronic device of claim 4, wherein
- the data located in the accelerator memory region comprises a plurality of data blocks,
- for the compressing, the one or more processors are configured to:
- in response to the distribution characteristic indicating that storage locations of the plurality of data blocks are proximate to each other, merge the plurality of data blocks; and
- compress the plurality of data blocks using the accelerator processor, and
- the plurality of data blocks has a size less than a third threshold value.

7. The electronic device of claim 4, wherein
- the data located in the accelerator memory region comprises a plurality of data blocks, and
- for the compressing, the one or more processors are configured to:
- in response to the distribution characteristic indicating that the plurality of data blocks is sparsely distributed, partition the plurality of data blocks into a plurality of groups;
- assign a plurality of streams to each of the plurality of groups; and
- compress the data located in the accelerator memory region based on the accelerator processor and the plurality of streams.

8. The electronic device of claim 1, wherein
- for the performing of the checkpointing operation, the one or more processors are configured to perform the checkpointing operation in parallel, and
- respective files generated by the checkpointing operation performed in parallel are independent of each other.

9. A processor-implemented method with data processing, the method comprising:
- receiving a checkpoint signal;
- in response to receiving the checkpoint signal, determining a location of related data of an application in a memory region;
- select one of a host processor and an accelerator processor based on the location of the related data in the memory region;
- performing a checkpointing operation on the related data using the selected processor; and
- compressing the related data using the selected processor that has performed the checkpointing operation,
- wherein the location of the related data in the memory region comprises a location in either one or both of a host memory region and an accelerator memory region.

10. The method of claim 9, wherein the performing of the checkpointing operation comprises:
- in response to first partial data of the related data being in the host memory region, determining a first overhead for performing the checkpointing operation on the first partial data using the host processor;

determining a second overhead for performing the checkpointing operation on the first partial data using the accelerator processor;

performing the checkpointing operation on the first partial data using a processor corresponding to a smaller one between the first overhead and the second overhead; and in response to second partial data of the related data being in the accelerator memory region, performing the checkpointing operation on the second partial data using the accelerator processor.

11. The method of claim 10, wherein the first overhead comprises a time for the host processor to compress the first partial data and a time for the host processor to store the compressed first partial data in a memory, and the second overhead comprises a time for moving the first partial data from the host memory region to the accelerator memory region, a time for compressing the moved first partial data, a time for moving the compressed first partial data from the accelerator processor to the host processor, and a time for storing the compressed first partial data in the memory.

12. The method of claim 9, wherein the compressing comprises:

in response to performing the checkpointing operation using the accelerator processor on data located in the accelerator memory region of the related data, determining a size and a distribution characteristic of the data located in the accelerator memory region; and compressing the data located in the accelerator memory region based on the determined size and the determined distribution characteristic.

13. The method of claim 12, wherein the compressing comprises:

in response to the determined size of the data located in the accelerator memory region being greater than a first threshold value, and in response to the determined distribution characteristic indicating that the data located in the accelerator memory region is stored successively, partitioning the data located in the accelerator memory region into a plurality of data blocks based on a second threshold value greater than the first threshold value; and compressing each of the plurality of data blocks using the accelerator processor.

14. The method of claim 12, wherein the compressing comprises:

in response to the data comprising a plurality of data blocks, and in response to the distribution characteristic indicating that storage locations of the plurality of data blocks are proximate to each other, merging the plurality of data blocks; and compressing the plurality of data blocks using the accelerator processor, and the plurality of data blocks has a size less than a third threshold value.

15. The method of claim 12, wherein the data located in the accelerator memory region comprises a plurality of data blocks, and the compressing comprises:

in response to the distribution characteristic indicating that the plurality of data blocks is sparsely distributed, partitioning the plurality of data blocks into a plurality of groups;

assigning a plurality of streams to each of the plurality of groups; and compressing the data located in the accelerator memory region based on the accelerator processor and the plurality of streams.

16. The method of claim 9, wherein the performing of the checkpointing operation comprises performing the checkpointing operation in parallel, and respective files generated by the checkpointing operation performed in parallel are independent of each other.

17. A non-transitory computer-readable storage medium storing instructions that, when executed by one or more processors, configure the one or more processors to perform the method of claim 9.

18. An electronic device with data processing, the electronic device comprising:

one or more processors configured to:

based on a location of related data of an application in a memory region, selecting either one of a host processor and an accelerator processor for performing a checkpointing operation on the related data; and in response to determining to perform the checkpointing operation using the accelerator processor on data located in an accelerator memory region of the related data, determine a size and a distribution characteristic of the data located in the accelerator memory region; and compress the data located in the accelerator memory region based on the determined size and the determined distribution characteristic.

19. The electronic device of claim 18, wherein, for the compressing, the one or more processors are configured to based on the determined size and the determined distribution characteristic, perform any one of:

partitioning the data located in the accelerator memory region into a plurality of data blocks;

merging the plurality of data blocks; and assigning a plurality of streams to each of a plurality of groups into which the plurality of data blocks are partitioned; and compress the data located in the accelerator memory region based on a result of the any one of the partitioning of the data, the merging of the plurality of data blocks, and the assigning of the plurality of streams.

* * * * *